Figure 8:
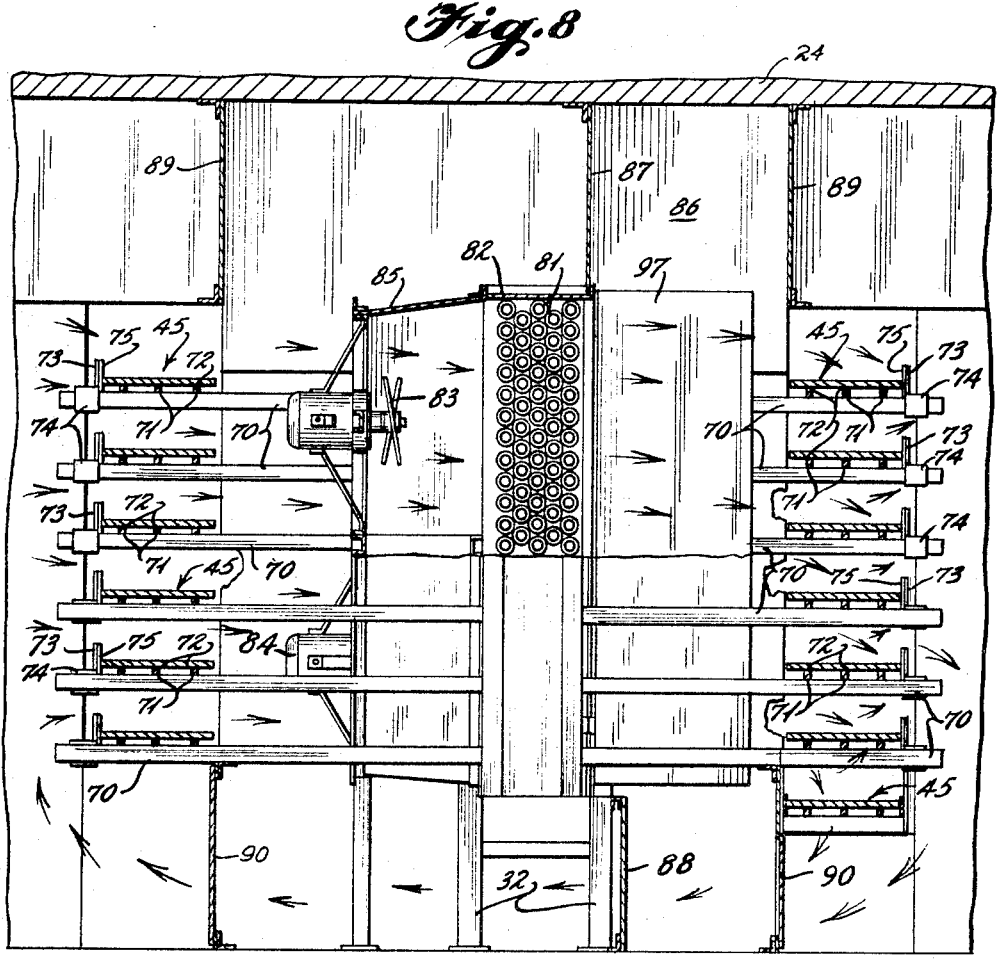

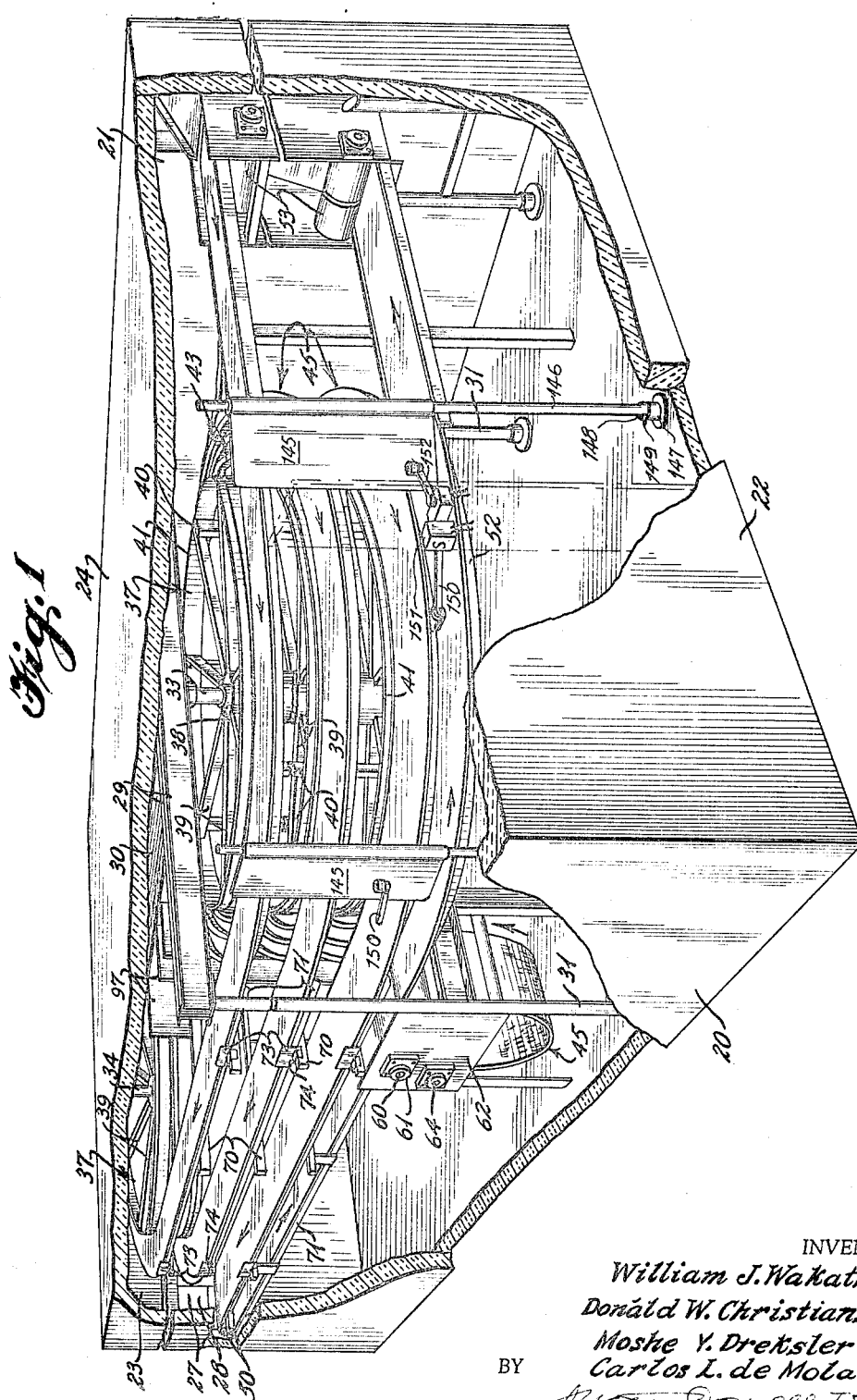

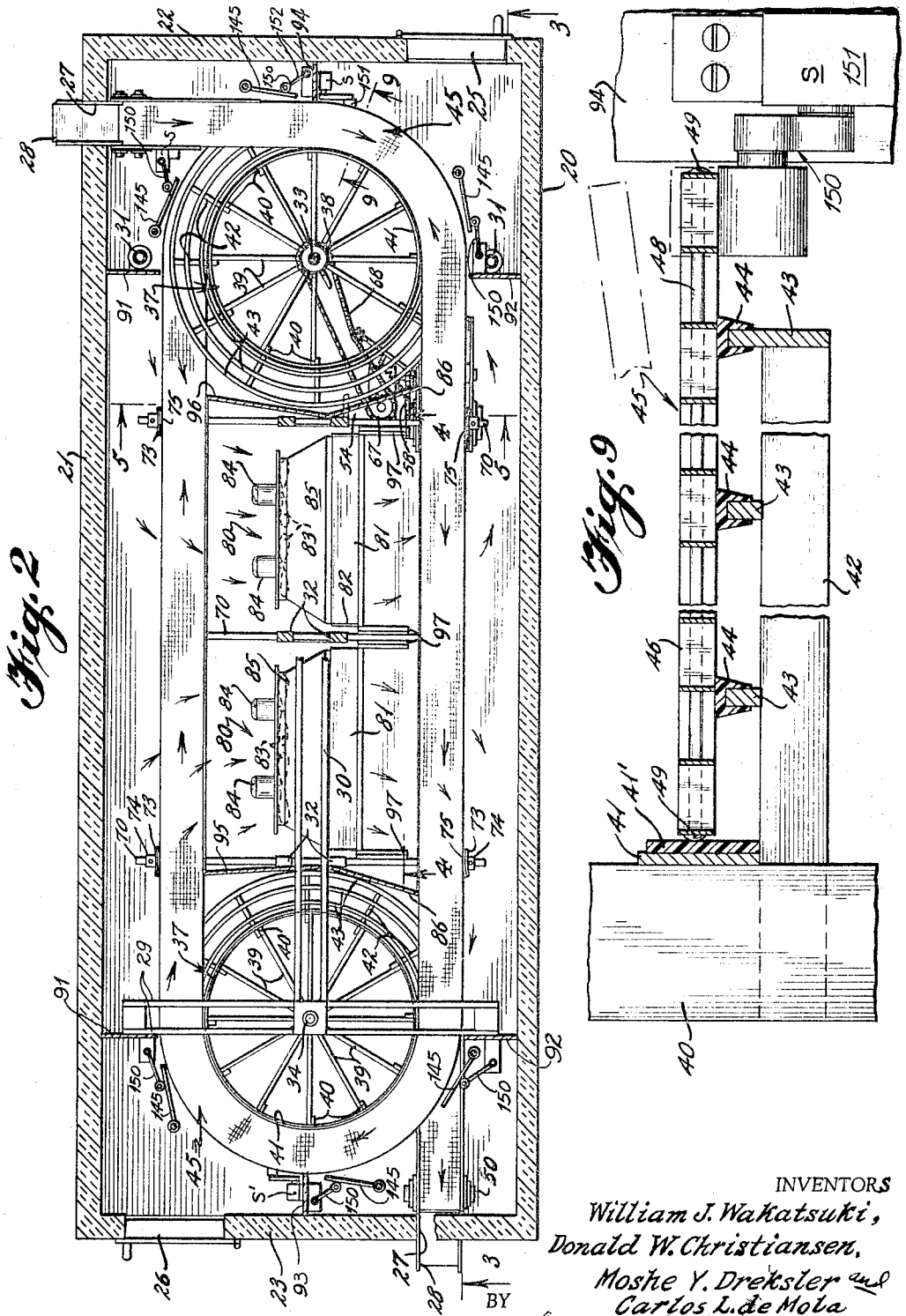

Aug. 30, 1966  C. L. DE MOLA ETAL  3,269,142
PROCESSING APPARATUS FOR CHANGING THE TEMPERATURE OF ARTICLES
Filed Dec. 24, 1964  13 Sheets-Sheet 3
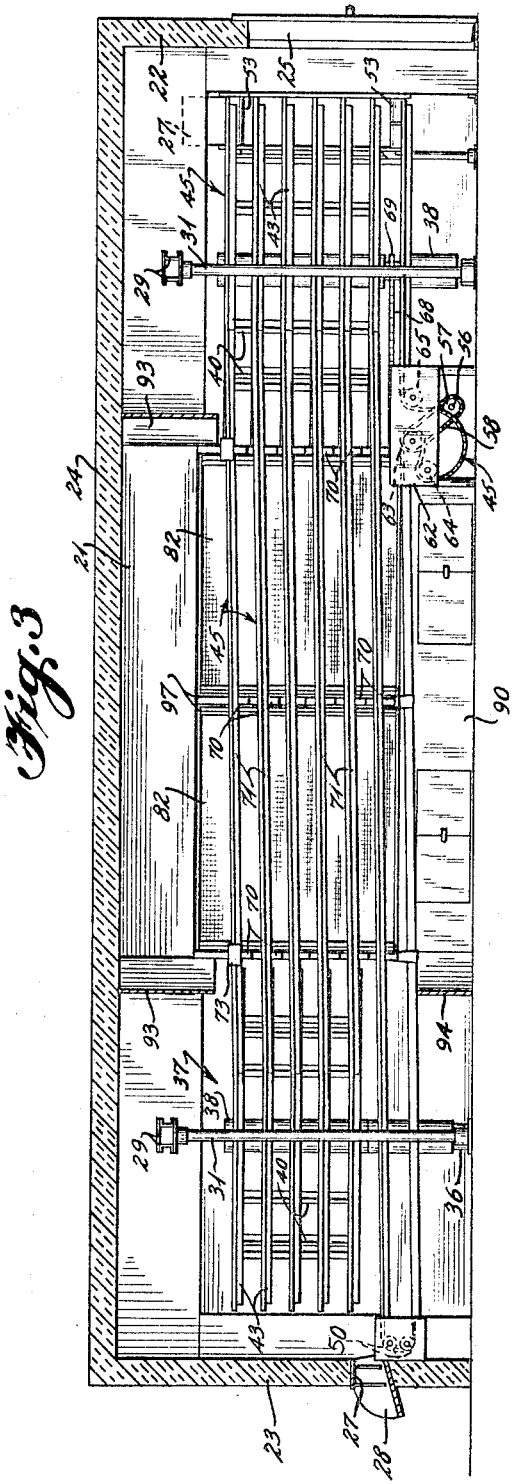
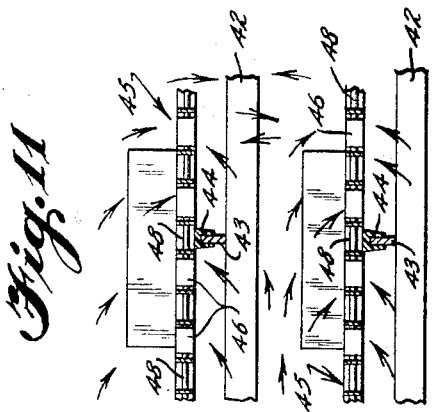
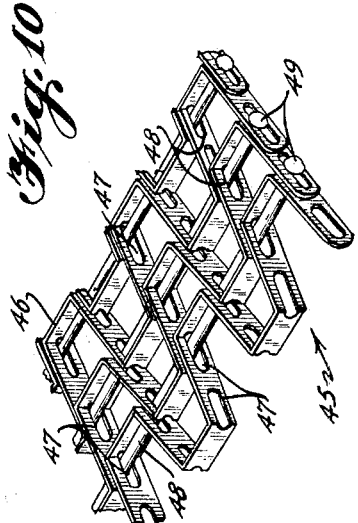
INVENTORS
William J. Wakatsuki,
Donald W. Christiansen,
Moshe Y. Dreksler and
Carlos L. de Mola
BY
ATTORNEYS

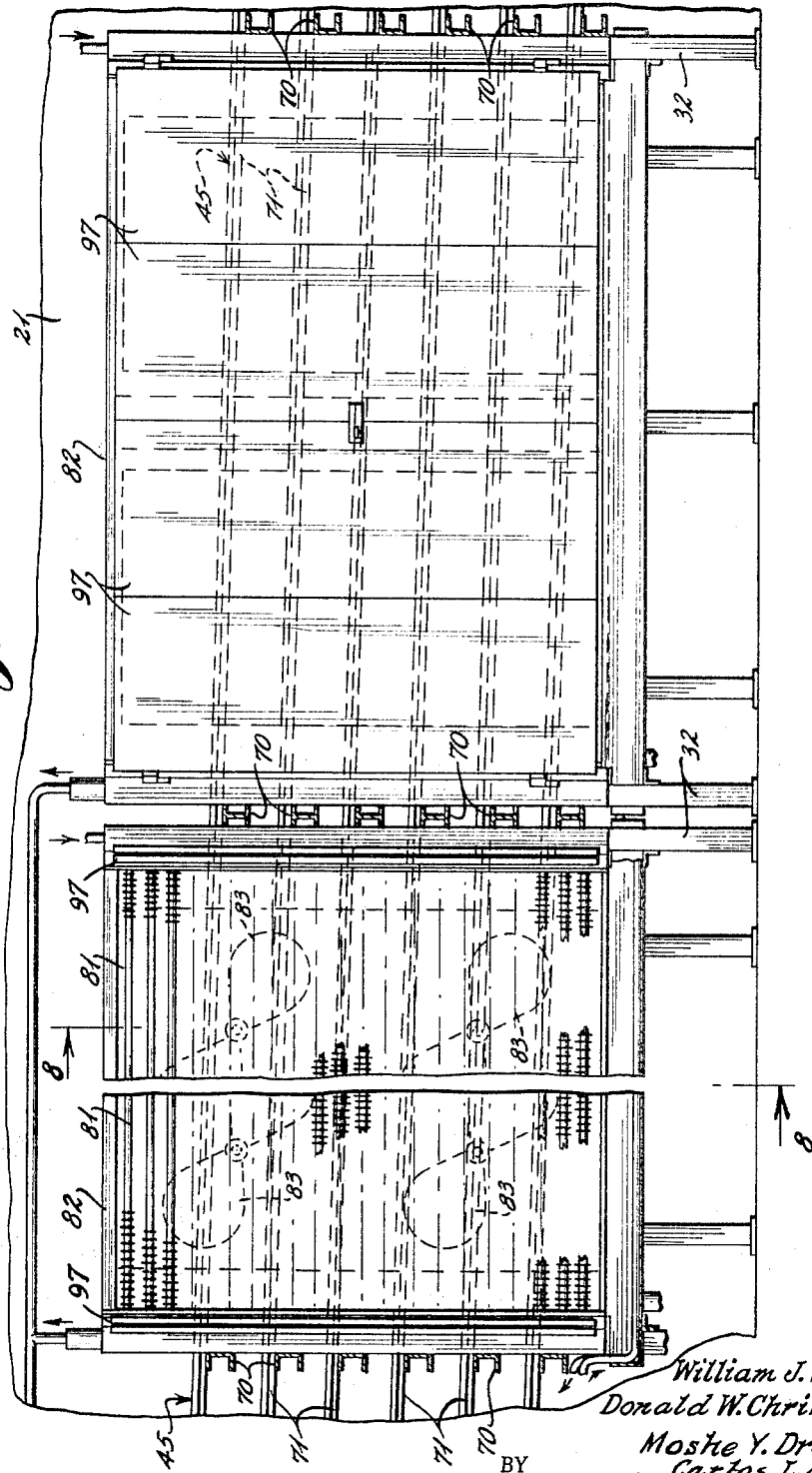

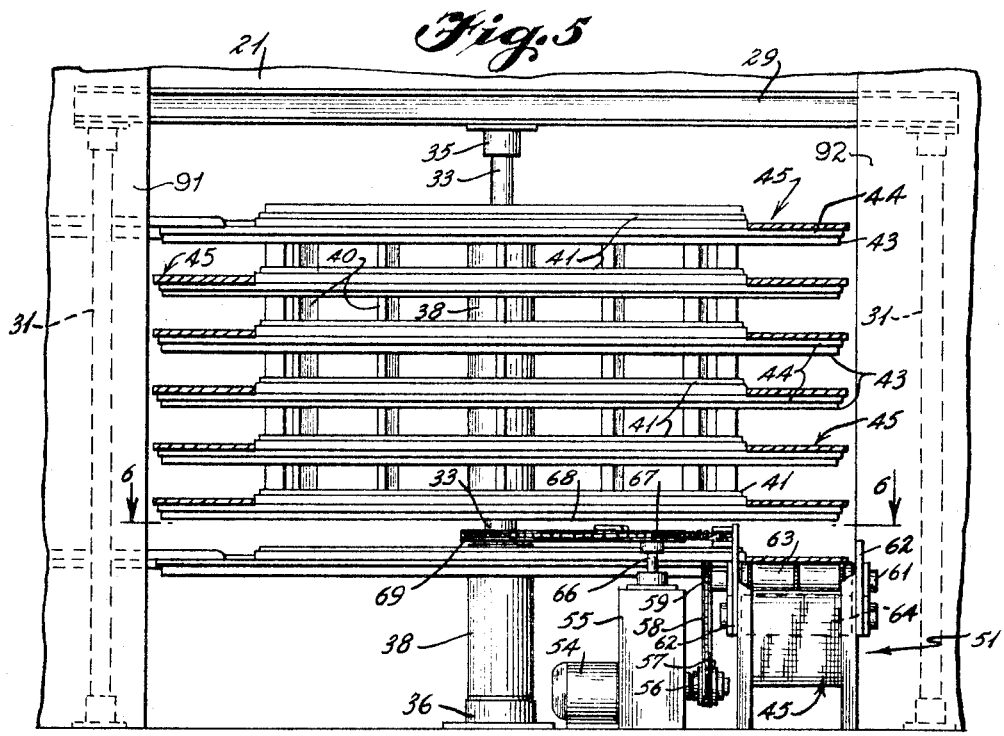
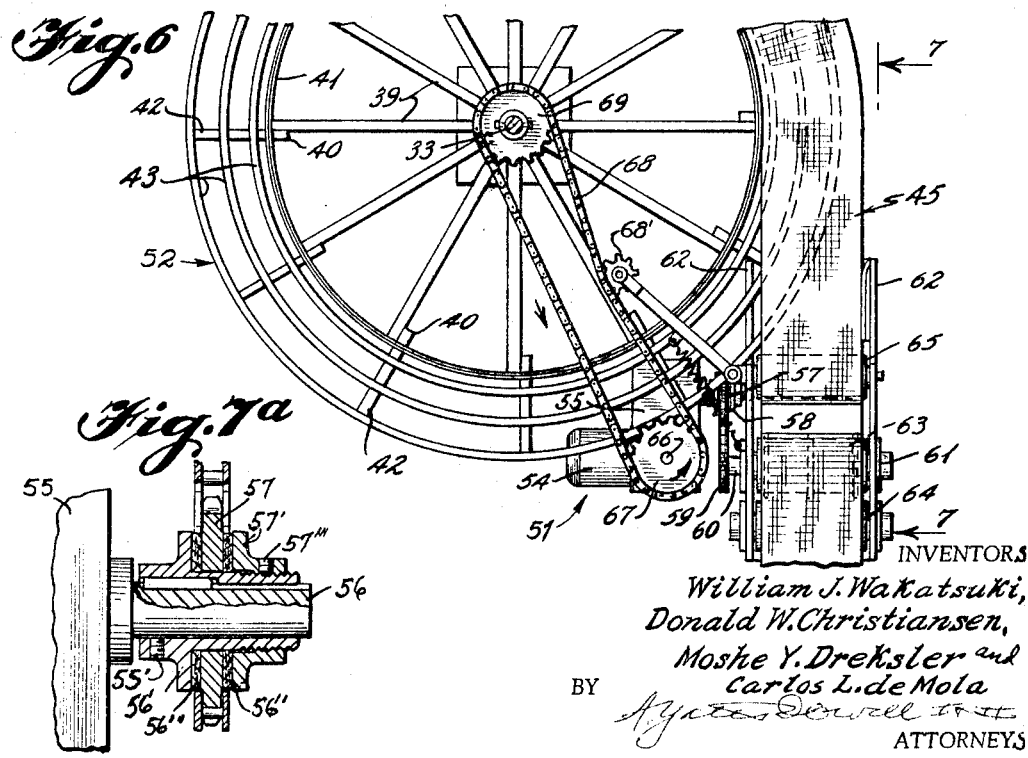

Aug. 30, 1966  C. L. DE MOLA ETAL  3,269,142
PROCESSING APPARATUS FOR CHANGING THE TEMPERATURE OF ARTICLES
Filed Dec. 24, 1964  13 Sheets-Sheet 6

INVENTORS
William J. Wakatsuki,
Donald W. Christiansen,
Moshe Y. Dreksler,
Carlos L. de Mola
BY
ATTORNEYS

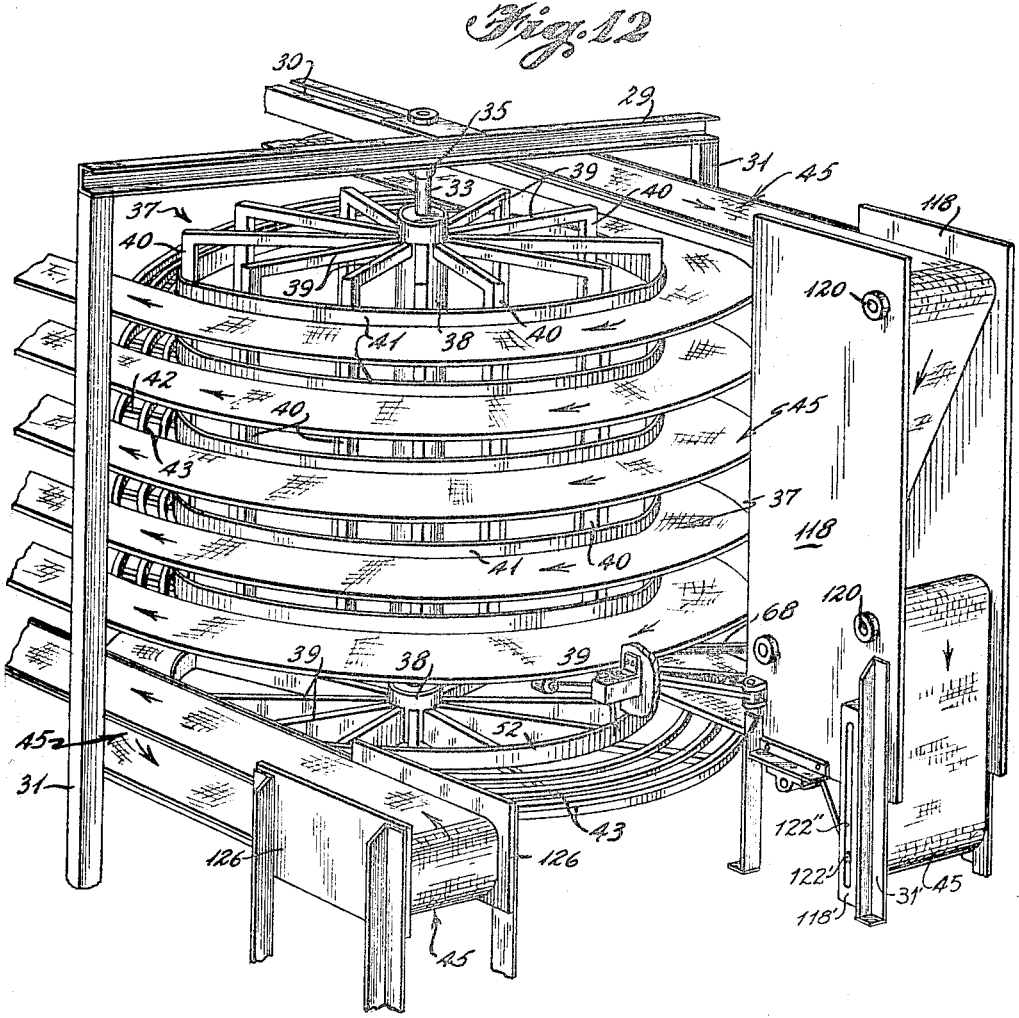
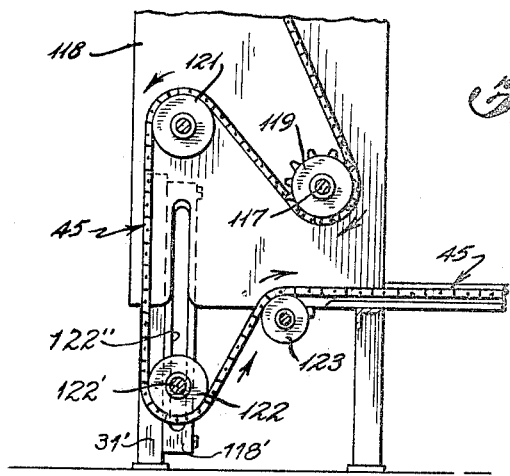

Aug. 30, 1966    C. L. DE MOLA ETAL    3,269,142
PROCESSING APPARATUS FOR CHANGING THE TEMPERATURE OF ARTICLES
Filed Dec. 24, 1964    13 Sheets-Sheet 8
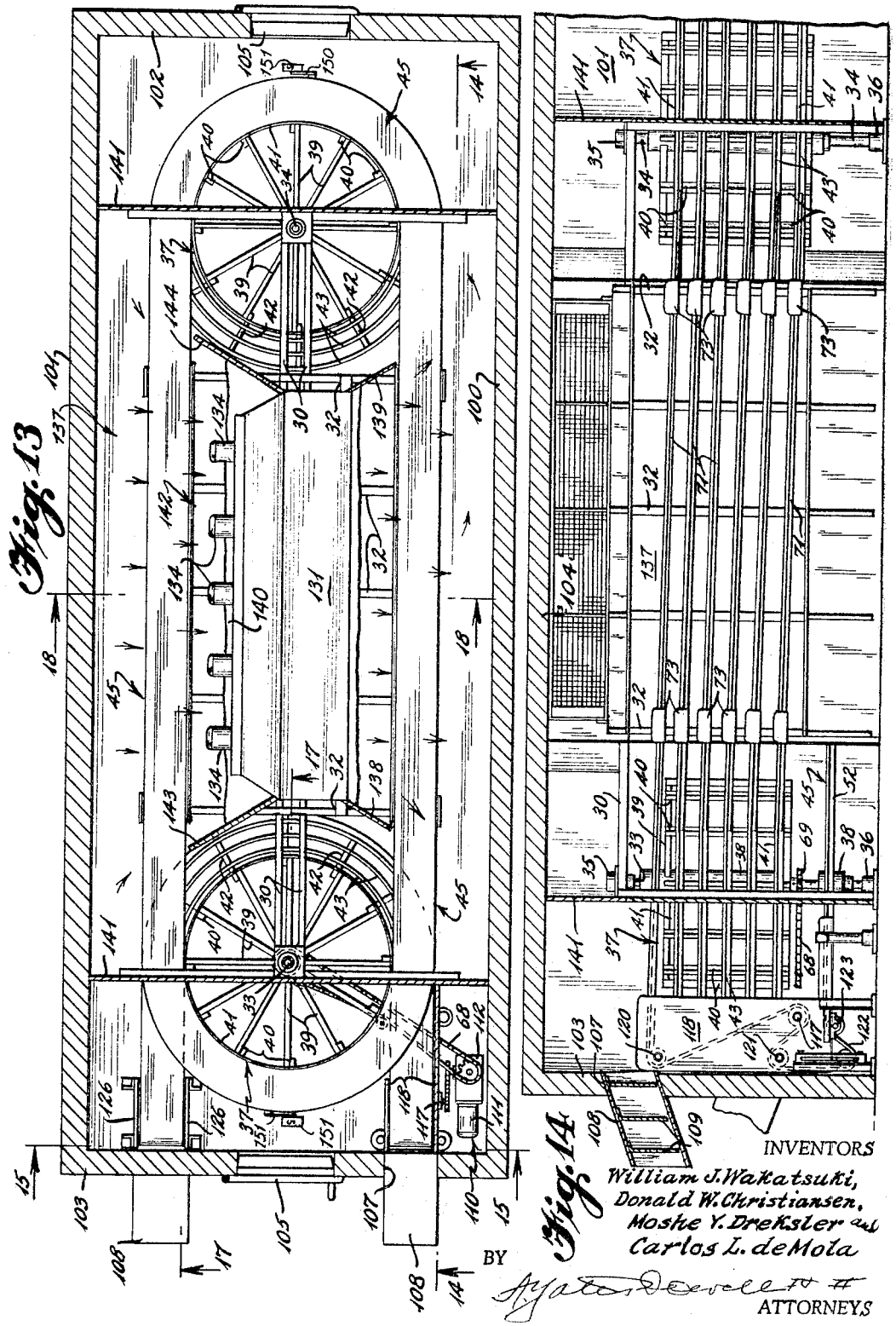
INVENTORS
William J. Wakatsuki,
Donald W. Christiansen,
Moshe Y. Dreksler and
Carlos L. de Mola
BY
ATTORNEYS Aug. 30, 1966  C. L. DE MOLA ETAL  3,269,142
PROCESSING APPARATUS FOR CHANGING THE TEMPERATURE OF ARTICLES
Filed Dec. 24, 1964  13 Sheets-Sheet 9

INVENTORS
William J. Wakatsuki,
Donald W. Christiansen
Moshe Y. Dreksler
Carlos L. de Mola
BY
ATTORNEYS

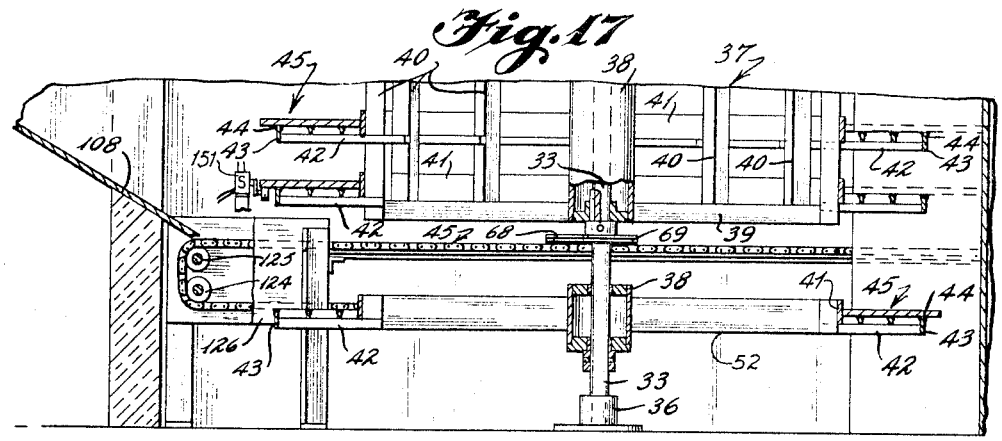

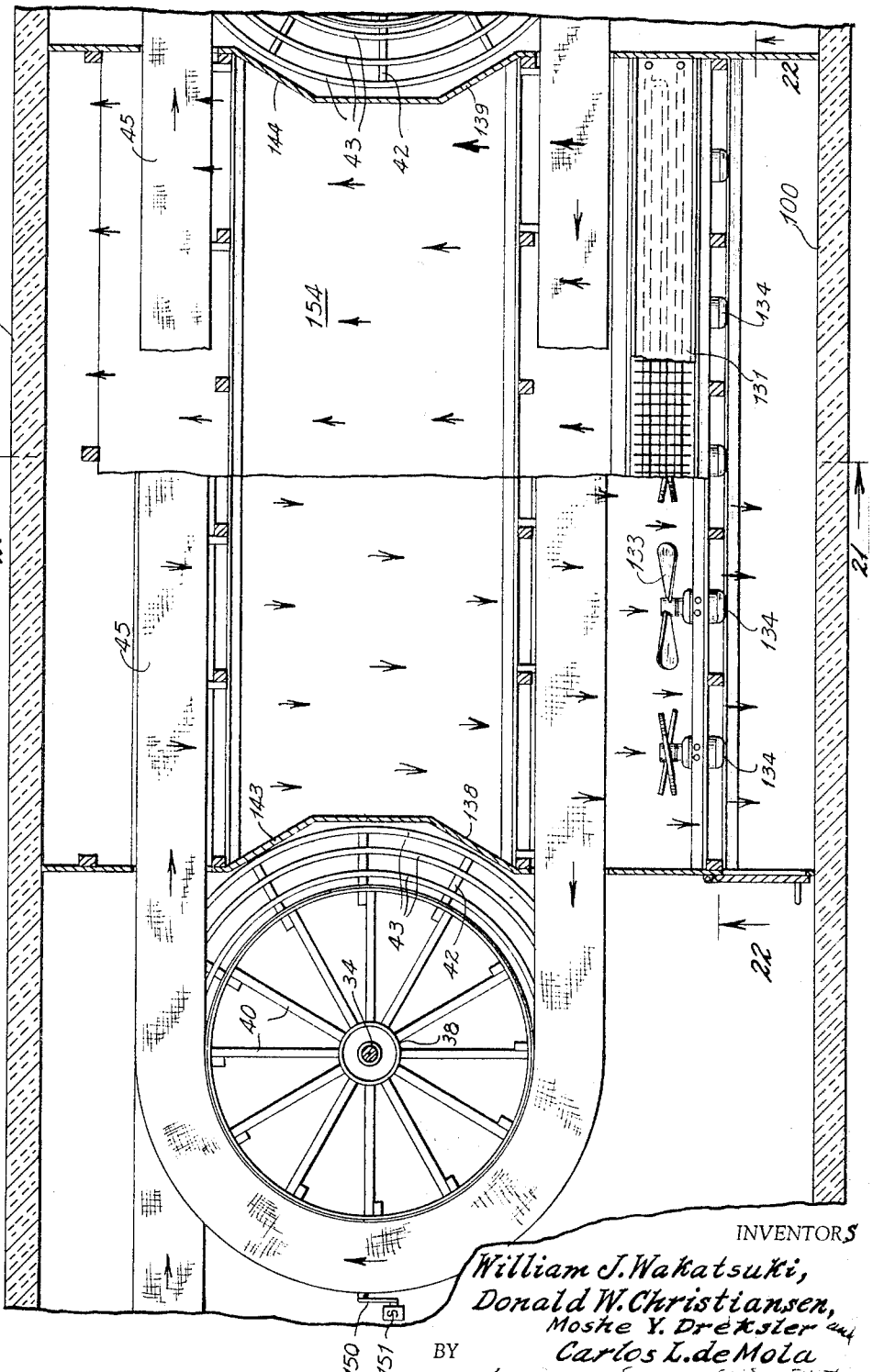

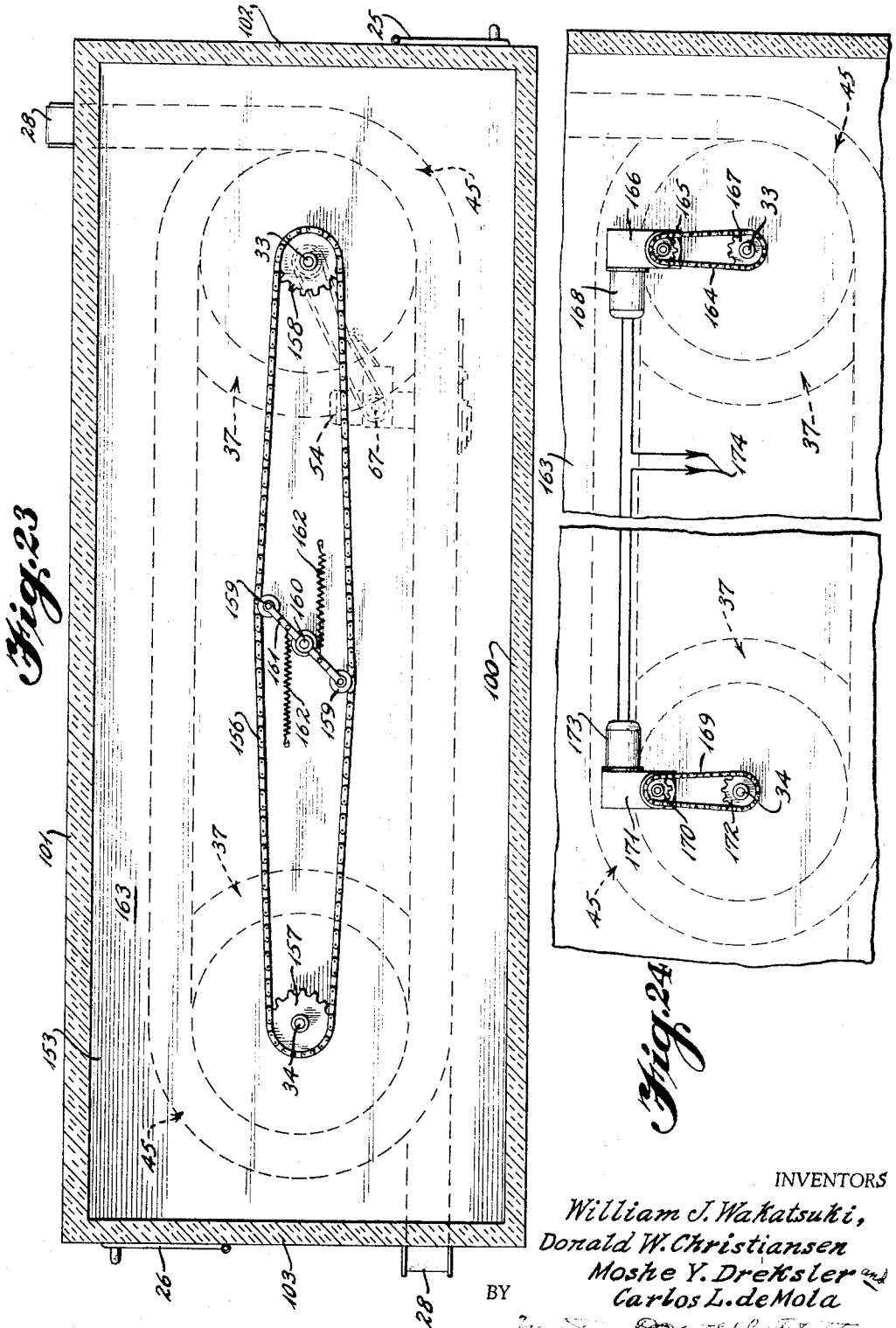

United States Patent Office 3,269,142
Patented August 30, 1966

3,269,142
PROCESSING APPARATUS FOR CHANGING THE TEMPERATURE OF ARTICLES
Carlos L. de Mola, Whittier, Calif., William J. Wakatsuki, Seabrook, N.J., Donald W. Christiansen, Kettering, Ohio, and Moshe Y. Dreksler, Waynesboro, Pa., assignors to Frick Company, Waynesboro, Pa., a corporation of Pennsylvania
Filed Dec. 24, 1964, Ser. No. 421,011
12 Claims. (Cl. 62—381)

This invention relates to refrigeration and refrigeration apparatus and equipment by means of which matter of various kinds can be subjected to lower temperatures including temperatures sufficiently low to cause quick freezing.

The invention relates particularly to refrigeration equipment for refrigerating a specific area and for conveying matter to be subjected to a low temperature in such area by a relatively slow movement by means of an endless conveyor arranged in an elongated spiral.

Heretofore refrigeration installations have occupied a great amount of space, were confined to a particular or fixed location, employed lengthy conveyors, and were inefficient and impractical. Prior conveyor mechanisms operated for a prolonged period in large areas. A change in conditions has made it desirable to give attention to compactness and to provide maximum capacity as well as area.

Other problems have been encountered in the provision of refrigeration systems employing endless conveyors, and which various problems arose due to changes in temperature, humidity, and air velocity resulting in expansion and contraction and the formation of ice and frost. A flat flexible belt traveling in a horizontal plane and remaining in that plane while reversing direction must necessarily have a reduction in length of the inner circumference or an increase in length of the outer circumference. This variation in length causes shifting of the product sometimes resulting in forcing the product off the surface of the belt or causing jamming at the vertical supports along the side. Also, during prolonged stoppage of the belt due to moisture present in the form of frost or ice could result in the freezing of the belt to its support and damage could result from the starting of the motion of the belt after freezing. The overcoming of difficulties of this kind has been undertaken by constant attention.

It is an object of the invention to overcome the aforementioned difficulties and to provide refrigeration apparatus including insulated generally rectangular wall structure defining a chamber or area to be refrigerated, and a conveyor compactly arranged within such chamber, with such conveyor providing maximum travel for matter to be refrigerated.

Another object of the invention is to provide refrigeration apparatus within an enclosure either portable or stationary of the character indicated, and which includes an endless foraminous belt or conveyor disposed in a horizontally elongated spiral, traveling in a curved path around a pair of spaced cylinders or wheels and in a straight line therebetween, such conveyor defining an oval spiral from loading to unloading stations with the refrigerating coils located within the enclosure and with the movement of the belt being adjustable in accordance with the material being frozen, and to allow maximum exposure to the refrigerated air and with blower means serving to distribute the air over the entire area of the coils to provide uniform temperature in the refrigerated area with suitable tensioning means and controls.

A further object of the invention is to provide a refrigeration system of compact character utilizing an endless foraminous link type self-adjusting belt conveyor of a construction to travel in a series of alternate straight and curved paths at graduated elevations defining a horizontally elongated spiral and then about horizontal shafts located at loading and unloading stations for reversing the direction of movement and, therefore, returning the belt from the unloading to the loading station for retravel and without the conveyor belt lifting from its support with the product during its travel occasioned by change of direction, speed of travel, and overloading between the loading and unloading stations, and with protective devices for accommodating expansion, contraction, shifting of the belt, and changes resulting from variations in temperature and humidity.

Figure 7:
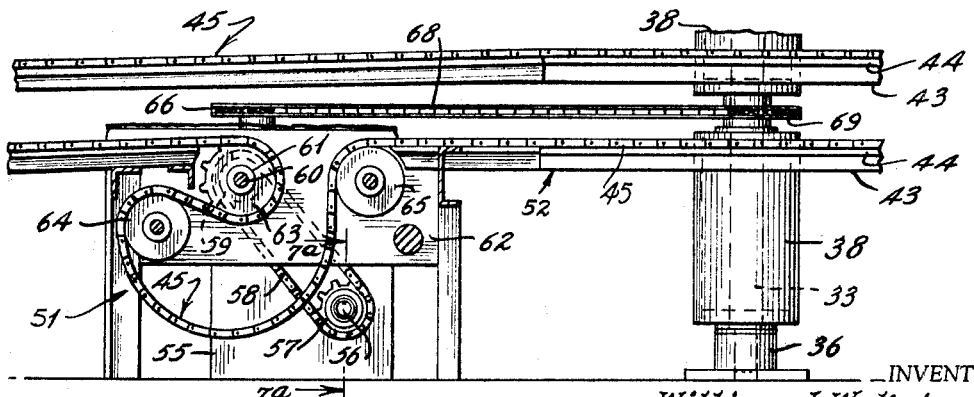
Figure 15:
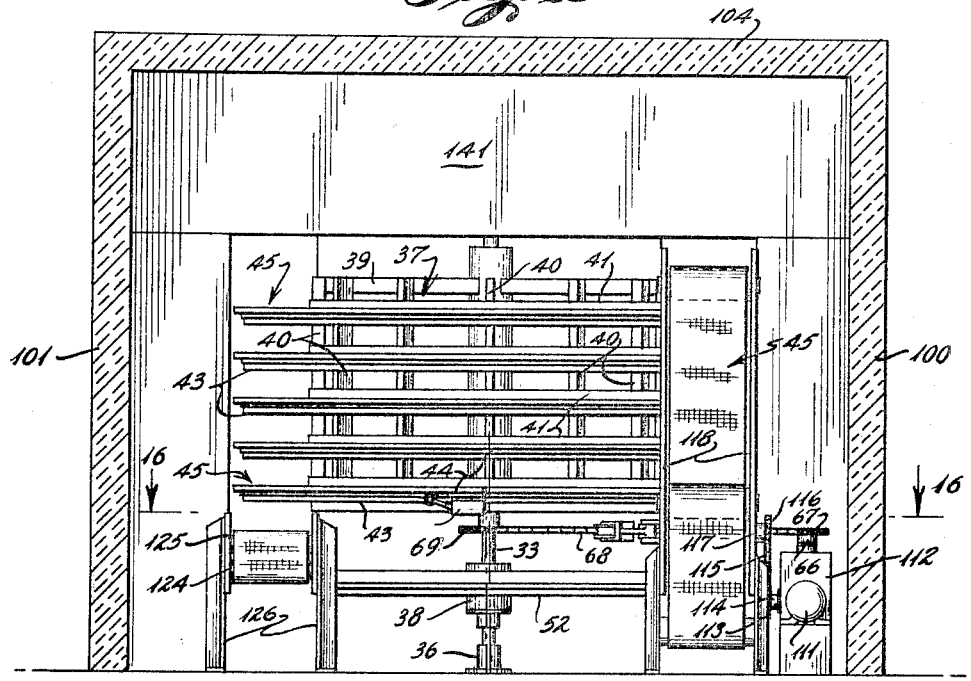
Figure 16:
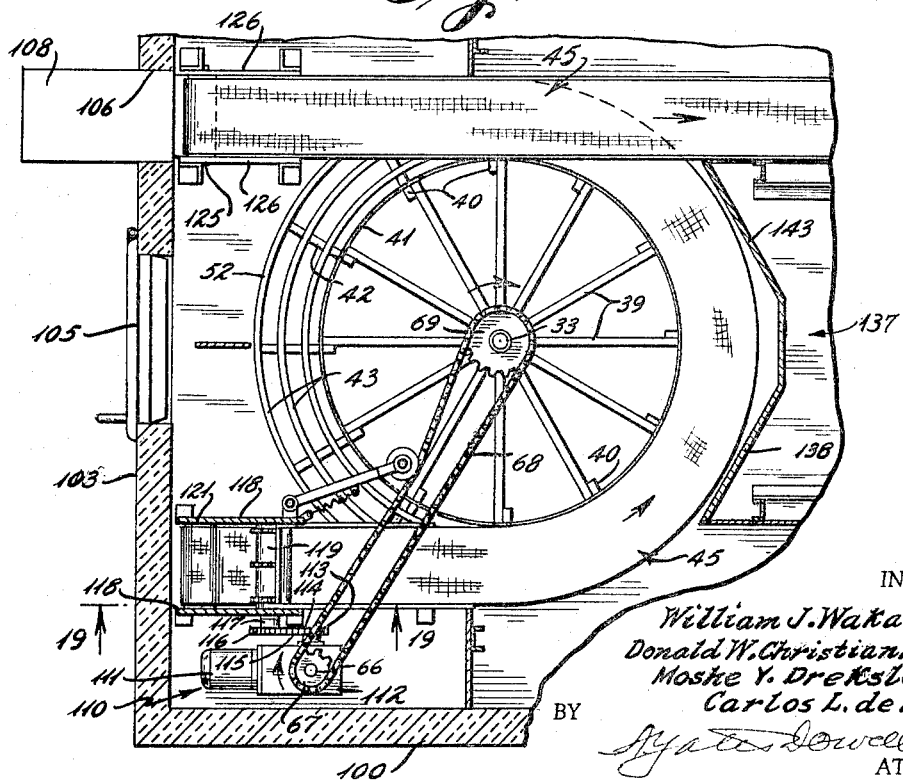
Figure 21:
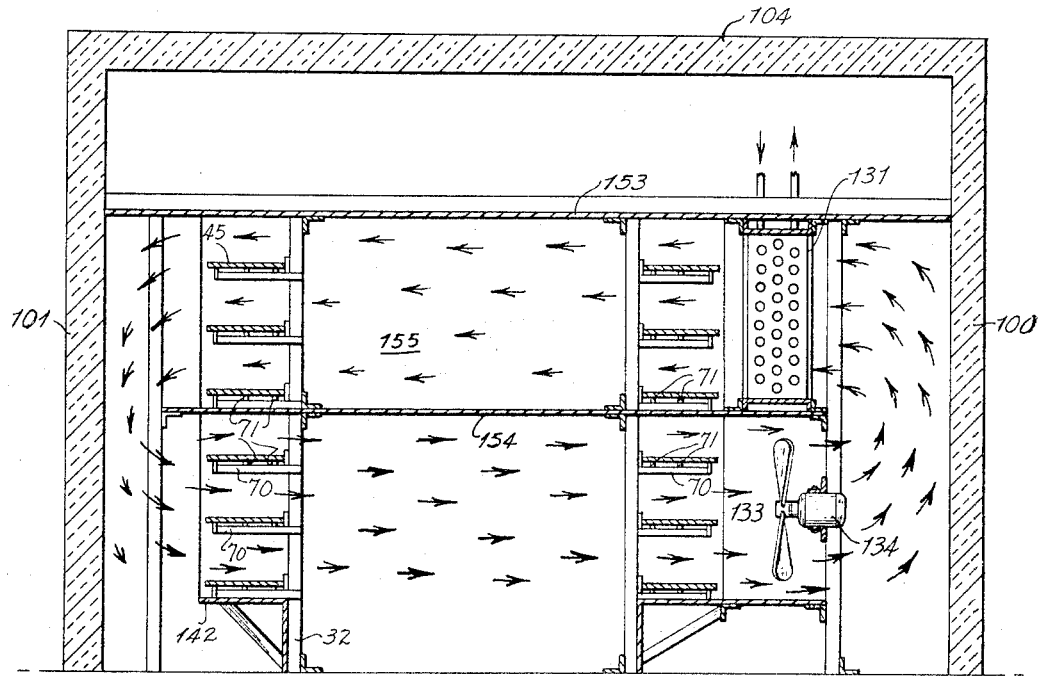
Figure 22:
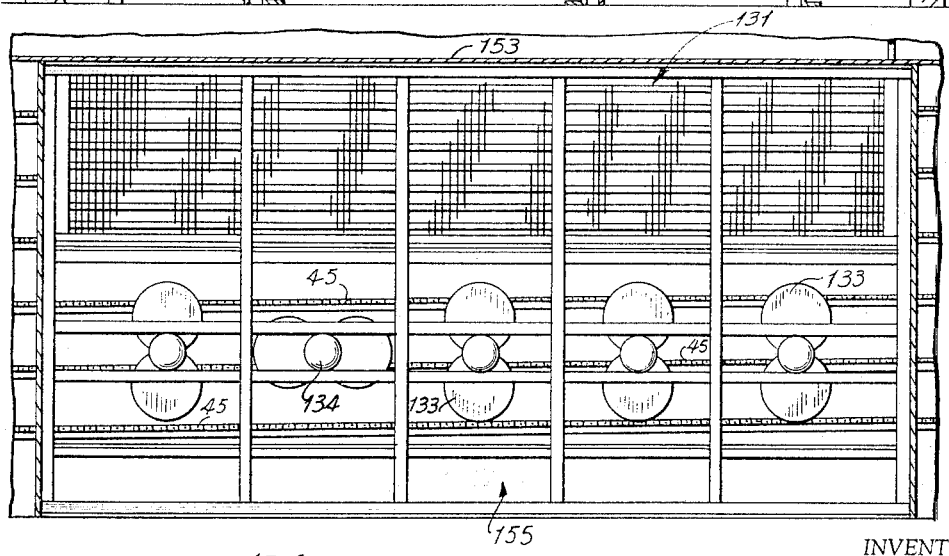

Other objects and advantages of the invention will be apparent from the following description taken in conjunction with the accompanying drawings in which:

FIG. 1 is a perspective illustrating one application of the invention;

FIG. 2, a plan view with the top removed;

FIG. 3, a vertical section on the line 3—3 of FIG. 2 disclosing the spiral conveyor in side elevation;

FIG. 4, a vertical section on the line 4—4 of FIG. 2 with the defroster doors in the right-hand section closed;

FIG. 5, an enlarged horizontal section on the line 5—5 of FIG. 2;

FIG. 6, a fragmentary enlarged detailed section on the line 6—6 of FIG. 5;

FIG. 7, an enlarged elevation on the line 7—7 of FIG. 6;

FIG. 7a, an enlarged fragmentary section on the line 7a—7a of FIG. 7;

FIG. 8, a vertical section on the line 8—8 of FIG. 4;

FIG. 9, an enlarged fragmentary vertical section on the line 9—9 of FIG. 6;

FIG. 10, an enlarged fragmentary plan of the belt;

FIG. 11, an enlarged fragmentary vertical section on the line 11—11 of FIG. 3 illustrating the conveyor belt;

FIG. 12, an enlarged fragmentary perspective of a modified form of spiral conveyor supporting mechanism;

FIG. 13, a top plan view of the modified form shown in FIG. 12;

FIG. 14, a vertical section on line 14—14 of FIG. 13;

FIG. 15, an enlarged vertical section on line 15—15 of FIG. 13;

FIG. 16, an enlarged horizontal section on line 16—16 of FIG. 15;

FIG. 17, a vertical section on line 17—17 of FIG. 13;

FIG. 18, a vertical section on line 18—18 of FIG. 13;

FIG. 19, a vertical section on line 19—19 of FIG. 16;

FIG. 20, an enlarged fragmentary top plan view with portions broken away;

FIG. 21, a transverse section on the line 21—21 of FIG. 20;

FIG. 22, a fragmentary vertical section on the line 22—22 of FIG. 20 with the refrigerating unit and blowers in elevation;

FIG. 23, a plan view with top removed illustrating a chain drive with a spring actuated idler mechanism; and, FIG. 24, a fragmentary top plan view illustrating a drive employed synchronous motors.

Briefly stated the invention is a refrigeration system including insulated wall structure defining a generally rectangular area or enclosure to be refrigerated, and within such enclosure is located endless conveyor means of a size and arrangement to extend close to the walls of the enclosure, and with the wall structure having loading and unloading passageways between such conveyor means and the exterior, said endless conveyor means being arranged generally horizontally in an oval spiral and comprised of a foraminous belt of a construction to travel in a curved path around a pair of spaced cylinders or wheels and in a substantially straight line tangentially therebetween, and within the spiral defined by the conveyor, or other convenient location, refrigeration coils are located with forced air circulating means for causing the air to pass over and through the conveyor with horizontal and vertical distribution thereof including baffle means and controls which provide uniform temperature throughout the refrigerated area.

With continued reference to the drawings, an elongated enclosure or area to be refrigerated is defined by insulated side walls 20 and 21, end walls 22 and 23, and a top wall 24. Certain of such walls, as for example, end walls 22 and 23, may have doors or other openings 25 and 26 for ingress and egress, and in the modification illustrated in FIGS. 1–11 the side wall 21 and end wall 23 have passageways 27 with sleeves 28 therein for the admission and discharge of matter to be frozen either in packaged or unpackaged condition at opposite ends of the enclosure.

Within the enclosure a refrigerating system is provided having means for retaining the matter to be frozen for a predetermined period of time sufficient to completely freeze such matter. Such system includes a frame having a pair of spaced, generally parallel cross members 29 which extend substantially across the enclosure adjacent to the end walls 22 and 23 and such cross members are connected by a central longitudinal member 30. The cross members 29 are supported by posts 31 at each end thereof and the longitudinal member 30 is supported by a plurality of posts 32 disposed between the cross members 29. A pair of upright shafts 33 and 34 are provided one at each end of the frame and the upper ends of the shafts are journaled in bearings 35 carried by the cross members 29 while the lower ends of the shafts are journaled within thrust bearings 36 mounted on the floor.

A cage or wheel 37 is fixed to each of the shafts 33 and 34 and each of such wheels includes spaced upper and lower hubs 38 having radial spokes 39 connected by substantially vertical connecting bars 40. A series of annular rims 41 provided with wear strips 41' are mounted in spaced relation on the connecting bars 40 with the rims on one wheel being staggered in a vertical direction relative to the rims on the other wheel. A plurality of outwardly extending auxiliary spokes 42 are mounted on the connecting bars 40 adjacent to the lower edge of the rims 42, and are adapted to support a series of concentric rings 43, each of which has an anti-friction cap or wear strip 44 fixed to the upper surface thereof.

For moving products to be refrigerated, an endless relatively flat foraminous conveyor or belt 45 is provided and such belt (FIGS. 10 and 11) is of collapsible link structure as disclosed, for example, in patent U.S. 2,872,023. The belt 45 includes a series of transverse links 46 which extend from side to side thereof in a serpentine path in which portions of one link overlap portions of adjacent links. Each of the overlapping portions is provided with slots 47 adapted to be aligned with the slots of adjacent peripherally disposed links for receiving a cross rod 48 having a retaining head 49 on each end exteriorly of the links. The slots permit the belt to travel in an arcuate plane in a horizontal direction by permitting one lateral edge of the links to be spaced differently from those of the opposite lateral edge.

The belt 45 extends inwardly from the point of entry of the material and around the wheels 37 carried by the shafts 33 and 34. Such belt extends tangentially at a slight angle from the rings of one wheel to the rings of the other wheel and then substantially half way around such wheel and back to the first wheel to form an elongated spiral which substantially fills the enclosure. The belt continues back and forth between the rings on the wheels of the shafts 33 and 34 until a desired number of convolutions or tiers have been placed on the wheels whereupon the belt passes over a pair of idler rollers 50 and through a drive mechanism 51. From the drive mechanism the belt extends around a wheel 52 carried by the shaft 33 below the wheel 37 and then around a pair of idler rollers 53 and up to the point of entry of the material to form a continuous conveyor. The wheel 52 is freely rotatable on the shaft 33 due to the fact that the belt will turn such wheel in a direction counter to the direction of the upper wheel 37 in order to return the belt to the point of entry of the material.

The drive mechanism includes a motor or other source of power 54 connected to a transmission 55 having a drive shaft 56 with a friction drive sprocket 57 freely mounted thereon as seen in FIGS. 7 and 7a. The friction drive sprocket 57 includes a sleeve 56' keyed to the shaft 56 and secured in place by a set screw 55'. The sleeve 56' has a flange at one end and threads at its opposite end. The sprocket 57 is freely mounted upon the sleeve 56' and held in place between two friction disks 56". Pressure or tension is applied to the sprocket by an adjustable collar 57' threadedly mounted on the end of the sleeve 56' and adapted to bear against the outer friction disk 56" which in turn engages the second or inner friction disk causing pressure to be applied to sprocket 57. When a desired tension has been applied to the sprocket 57 by tightening the collar 57' the collar is secured in place by set screw 57".

The sprocket 57 is adapted to drive a chain 58 which in turn drives a sprocket 59 carried by a shaft 60 journaled in bearings 61 carried by spaced support plates 62. A sprocket roller 63 is fixed to the shaft 60 intermediate the support plates 62 and the belt 45 extends around and is driven by such sprocket roller, after which the belt extends around idler rollers 64 and 65 rotatably carried by the support plates 62. If desired, the belt 45 may sag or form a loop between the idler rollers 64 and 65 to compensate for expansion and contraction of the links due to the temperature within the refrigerated area, or as to be described later, tension means may be provided to form the desired loop.

In order to keep the belt 45 from tilting up as it goes around the wheels 37 due to the fact that such belt is driven only at one position on the lower run, it is desirable to positively rotate the shaft 33 and the wheel 37 carried thereby either in synchronism with the movement of the belt or at a slightly faster speed. To do this, the transmission 55 has a second drive shaft 66 having a drive sprocket 67 mounted thereon for driving a chain 68 which in turn drives a driven sprocket 69 fixed to the shaft 33. The drive chain 68 is held in engagement with sprockets 67 and 69 by means of a spring loaded idler 68'. The sprockets 67 and 69 may be substantially the same size to synchronize the movement of the shaft with the movement of the belt, or the driven sprocket 69 may be slightly smaller than the drive sprocket 67 so that the wheels will rotate slightly faster than the movement of the belt. When the shaft 33 is rotating slightly faster than the belt, a slight amount of slippage will occur between the belt and the wheels. The shaft 34 is freely rotatable within the bearings 35 and 36 and constitutes an idler which is rotated by the belt 45.

Microswitches S and S' are mounted at opposite ends of the unit (FIG. 2) in a manner that their operating arms or levers are in a position to be engaged by the under surface of the outer edge of the belt 45 so that if the belt should be subjected to greater stress and tilt upwardly (FIG. 9) at either of such locations the respective microswitch will interrupt the flow of electric current to the operating motors and cause stoppage of the device.

In order to support the belts between the wheels carried by the shafts 33 and 34, each of the intermediate posts 32 is provided with an outwardly extending arm 70 located below the belt and since the wheels on the shafts are staggered, the arms of one post will be at a slightly different elevation than the arms of the other posts. The arms are adapted to support a plurality of runners 71 extending from a position closely adjacent to the periphery of one wheel across the arms 70 to a position closely adjacent to the periphery of the other wheels. Each of the runners 71 has an anti-friction cap or wear strip 72 attached to the upper surface thereof so that the coefficient of friction will be reduced to a minimum. The arms 70 closest to the wheels 37 are each provided with a guide member 73 fixed to a sleeve 74 adjustably mounted on such arms and such guide member has a wear strip 75 disposed along the inner surface thereof for engagement by the outer edge of the belt 45 so that the belt will bear against the wear strip to cause the belt to extend tangentially of the wheels carried by the shafts 33 and 34.

In order to freeze the product carried by the belt 45, a refrigerating unit 80 is provided and includes a freezer coil 81 carried in a housing 82 to which refrigerant is supplied from a source of supply (not shown). A plurality of fans 83 driven by motors 84 are mounted within a housing 85 adjacent to the housing 82. The coils and fans are located intermediate the wheels carried by the shafts 33 and 34 and are disposed in a position so that the fans will blow air through the coils in heat exchange relation therewith and thereafter across the runs or tiers of the belt 45 on one side of the enclosure. The air passes over the various runs of the belt on one side and over and around the product being refrigerated, and as illustrated in FIGS. 8 and 11, such air passes through the foraminous belt to expose all sides of the product to the air. After the air passes over the various runs of the belt, such air is directed by a series of baffles around the opposite ends of the enclosure and along the various runs or tiers on the opposite side thereof and is returned to the fans to be recooled and recycled. The series of baffles includes side baffles 86 at the discharge from the coil housing, upper and lower baffles 87 and 88 at the upper and lower portions of such housing, upper and lower baffles 89 and 90 disposed above and below the runs of belt to restrict the air to the area of freezing, upper and lower end baffles 91 and 92 located diametrically opposite the shafts 33 and 34, and upper and lower baffles 93 and 94 located adjacent to the end walls 22 and 23. Also baffles 95 and 96 are disposed adjacent to the inlet portion of the fans 83. The baffles are arranged in a manner to induce circular motion over and through the runs of belt on one side and around opposite ends thereof and then over and through the runs of belt on the opposite side and return to the fans 83 to be recycled.

The coil housing 82 may have folding doors 97 which normally are open when the refrigerating system is in operation but which may be closed and warm fluid introduced through the coils to defrost such coils. During the defrosting operation the fans are operated to force air over the coils in heat exchange relation therewith to accelerate the defrosting of the coils without substantially altering the temperature within the remainder of the refrigerated area. When the defrosting operation has been completed, the doors are again opened and refrigerant is again introduced into the coils 81.

Although two independent refrigerating units are disclosed, it is contemplated that a greater or lesser number could be used since the number of units and the capacity thereof will be determined by the product being frozen as well as the speed of the belt 45.

With reference to FIGS. 12–19, a modified form of the invention is illustrated in which the inlet and discharge are at the same end of the refrigerated enclosure. In this modification the refrigerating area or enclosure is defined by side walls 100 and 101, end walls 102 and 103, and a top wall 104. The end walls 102 and 103 are each provided with an access door 105 to permit entry and exit from the structure. The shafts, wheels and framework are substantially the same as previously described; however, the arrangement of the belt 45 is somewhat different.

In this modification the inlet for material is at the lowermost run of the belt and the discharge from the belt is at the uppermost position. Material to be frozen is introduced onto the inlet end of the belt through an aperture 106 in the end wall 103 and the discharge is through an aperture 107 in the same end. In order to retain the refrigerated air within the enclosure, each of the apertures 106 and 107 is provided with a sleeve 108 and each of such sleeves has a plurality of depending baffles or flaps 109 which permit the product to pass underneath, at which time the flaps will swing to permit the passage of such product. The flaps 109 preferably are located in a position such that the end flaps are spaced apart a distance greater than the bulk of the product so that at least one flap will be hanging substantially vertically at all times to prevent the escape of air from the enclosure.

The drive mechanism 110 includes a motor 111 connected to drive a transmission 112. The transmission has a first drive shaft 113 with a drive sprocket 114 thereon and such drive sprocket engages a chain 115 which in turn drives a driven sprocket 116 mounted on one end of a shaft 117 journaled in side plates 118. A sprocket roller 119 is fixed to the shaft 117 in a position to engage and drive the foraminous belt 45 after the material has been discharged therefrom. An idler roller 120 is journaled in the upper portion of the side plates 118 and such belt extends over the idler roller in a position clearly adjacent to the discharge sleeve 108. The sprocket roller 119 drives the belt by means of the sprockets on such roller engaging the links of the foraminous belt and exerts a pulling force to move the belt in a lengthwise direction as seen in FIGS. 12, 14 and 19.

From the sprocket roller 119, the belt 45 extends over an idler roller 121 downwardly and around a slack-forming weighted idler roller 122 mounted on shaft 122' and then over idler roller 123. Shaft 122' is reciprocable in slots 122" of bars 118' affixed to angle members 31' attached to the side members 118. The shaft 122' carrying idler 122 is weighted and will move downwardly when the slack in the belt will permit or will move up as the slack is taken up. In order to move the belt over to the opposite side of the enclosure and in a position to receive material, such belt passes over and substantially half way around the lowermost wheel 52 which is freely rotatable on the shaft 33 so that it can rotate in a direction counter to the direction of rotation of the wheels 37. At the opposite side of the wheel 52, the belt extends to a position closely adjacent to the end wall 103 and upwardly over idler rollers 124 and 125 journaled in support plates 126. From the idler roller 125 the belt extends rearwardly to the lowermost rings of the wheel carried by the shaft 34 and then back to the rings of the wheel carried by the shaft 33 to form an elongated spiral as previously described.

If desired the refrigerating unit 130 may be located above the runs of conveyor belt to provide ready access thereto. The refrigerating unit includes a housing 131 with a refrigerating coil 132 therein supplied with a refrigerant in any desired manner including from an exterior source. A series of fans 133 driven by motors 134 are mounted within the housing 131 and are adapted to force air over the coils 132 in heat exchange relation therewith. The flow of air from the coils is directed and caused to travel in an annular path transversely of the unit between end baffles 135 and 136 forming a central area or compartment 137. Baffles 138 and 139 and a floor 140 direct the flow of air outwardly from the refrigerant coils 132 and across and above the runs of belt and through the runs of the belt by upper and lower baffles 141 and 142 within the enclosure 137.

The refrigerated air which has passed over, around and through the runs of the conveyor belt within the enclosure 137 and retained within the area of the belt runs by the upper and lower baffles 141 and 142. The air thus confined is directed within the area or compartment 137 in a generally circular path. From the compartment 137 the air is drawn by fans 133 between the baffles 143 and 144 and is recirculated in heat exchange relationship with the coils 132.

In the operation of the device matter to be refrigerated is introduced into the closure by means of inlet passageways 27 or 108 and is deposited on the belt 45. The belt, which is driven by the drive mechanism 51 or 110, travels in an elongated spiral path about the wheels 37 and along the runners 71 until several convolutions or tiers have been traversed and the material has been completely frozen. The frozen material is discharged from the enclosure through a discharge passageway or sleeve 28 or 108 where it is removed to storage or shipping areas. Preferably the shaft 33, on which one of the wheels 37 is mounted, is driven from the drive mechanism and such shaft is rotated in synchronization with the movement of the belt 45 or at a slightly faster rate of speed to prevent the belt from buckling or tipping up as it moves around the wheels. If the belt 45 should bind or buckle the friction drive sprocket 57 would slip stopping the forward movement of the belt thereby eliminating any damage that might be caused by the belt wrapping around the shafts 33 and 34.

The air within the enclosure is modified by a temperature modification device such as refrigerating unit 80 or 130 and such air is directed over, around the through the various runs or tiers of the foraminous conveyor belt to expose all sides of the material being frozen to the refrigerated air. Also in one form of the invention (FIGS. 1 and 2) the air is directed around the ends of the elongated spiral conveyor and along the opposite sides of the belt to expose the material being frozen to the air during the entire time that such material is within the enclosure. Preferably the flow of air is confined to the area of the belt to derive the most benefit therefrom.

Wing baffles 145 are mounted on upright shafts 146 journaled in bearings 147. Each of the bearings 147 has a shoulder 148 against which a pin or projection 149 is adapted to engage to limit the rotary motion of the shaft 146. Matter carried on the conveyor not properly located and tending to be discharged from the conveyor will engage one of the baffles 145 and move an arm 150 of a microswitch 151 to interrupt the flow of electrical current to the drive motors to cause stoppage thereof and the conveyor driven thereby. The arms 150 are urged towards the baffles 145 by springs 152.

In FIGS. 20, 21 and 22 there is disclosed a further form of the invention in which the air is circulated in a different manner over the matter to be refrigerated and ready access is afforded to the refrigerating and air circulating system. In this embodiment a false ceiling 153, and a centrally located baffle or shelf 154 forming stratification means, are employed within a chamber defined by wall structure 155. Air is blown over refrigeration or temperature modification coils by a fan 133 and then over the matter to be treated on the upper runs of the conveyor. Thus the matter entering the chamber and travelling on the upper runs of the conveyor is subjected to colder air than that of the lower runs of the conveyor beneath the center partition or shelf 154.

In installations of refrigeration equipment according to the present invention in which the shafts 33 and 34 are spaced a relatively great distance apart, it has been found desirable to drive the shafts 33 and 34 in synchronism, and this can be done as illustrated in FIG. 23 by means of a chain 156 driving the shaft 34 by means of a sprocket 157 from a sprocket 158 on the driven shaft 33. In order to maintain proper tension on the chain, a takeup mechanism may be employed as, for example, rollers 159 which can rotate about a shaft 160, such rollers being rotatably mounted on a shaft by means 161. Tension springs 162 urge the rollers 159 against the chain 156, thus maintaining a uniform tension on the chain at all times. A convenient location for the chain 156 is in the upper area 163 and the upper portion of the refrigeration unit about the false ceiling 153.

The invention also contemplates the driving of the shafts 33 and 34 in synchronism by the utilization of separate motors 168 and 173 driving through gear boxes 166 and 171, the sprockets 165 and 170 respectively, and through chains 164 and 169, the gears 167 and 172 fixed to the shafts 33 and 34 respectively, electric energy being supplied through conductors 174. The wheels 37 reduce the frictional resistance on the conveyor belt 45. However, the invention contemplates the elimination of one or both of such wheels where they are not necessary.

The speed of movement of the belt is controlled by the drive mechanism in accordance with the temperature within the enclosure as well as the material being frozen so that the material is being supplied to and discharged from the enclosure in a continuous flow. The drive mechanism may be operated in either direction so that the inlet for material to be frozen may be located in the lowermost portion of the enclosure and the material will travel generally in an upwardly direction, or may be located at the uppermost portion so that the material will travel downwardly. Also the inlet and outlet may be located in the same wall or may be located in different walls so that the feeding and discharge mechanism will be entirely divorced from each other.

It will be apparent that a compact refrigeration system has been provided having a foraminous belt disposed in an elongated spiral and located within an enclosure in which the air is modified by passing over refrigerating coils after which it is circulated over, around and through the belt and along the entire length thereof.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A refrigeration system including insulated wall structure defining an elongated chamber to be refrigerated, an endless relatively flat foraminous belt conveyor arranged in tiers defining generally a spiral, said wall structure having openings therein for access to said conveyor for the loading and unloading thereof, wheels rotatably mounted in spaced relation and having portions supporting the several tiers in a manner that the conveyor can travel in a curved path around the wheels and in a straight path therebetween, cooling coils within said chamber, means for driving the wheels with the weight of the conveyor and that of the product and the friction between the conveyor and wheels serving to drive the conveyor and means or producing forced circulation over and through the conveyor for providing uniform temperature throughout said chamber.

2. A freezing system comprising spaced vertical shafts, a series of wheel assemblies mounted in spaced relation on each of said shafts, an endless conveyor belt extending around the wheel assemblies on said shafts in a generally oval spiral path, said conveyor being of relatively flat foraminous link construction, capable of travelling horizontally in a straight line or around a curve by shortening along one edge and lengthening along the other in accordance with the curvature in its path of travel, a loading station and an unloading station beside said conveyor with said belt providing a gradual variation in elevation therebetween, generally horizontally disposed roller means at said loading and unloading stations reversing the direction of travel of said conveyor, means for driving one of the vertical shaft wheel assemblies with the weight of the conveyor and the product and the friction between the belt and support wheels imparting motion to the belt, an auxiliary drive for the belt where the direction of the belt changes from horizontal to vertical and serving to distribute tension and compensate for the natural slippage of the conveyor, and a tensioning device in the drive for the vertical wheel assembly.

3. In an article processing system for changing the temperature of articles processed, structure defining a heat insulated chamber, spaced apart supporting wheels rotatably mounted in said chamber, endless flat belt conveyor means encircling and supported by said wheels, and having a length sufficient to provide a slack portion, belt drive means engaging said belt rearwardly of said slack portion relative to the direction of movement of the belt, and wheel drive means for rotating one of said wheels to aid in driving said belt, the driving speed of said wheel driving means end of the belt driving means being correlated to prevent tilting of the portion of the belt travelling in a curved path about the curvature of the wheel.

4. Refrigeration apparatus comprising spaced rotatable wheel assemblies having spaced vertical tiers, at least one endless conveyor for supporting thereon matter to be refrigerated, said conveyor being of generally flat foraminous construction with portions mounted to travel in a curved path by shortening along one edge and lengthening along the other while in a substantially horizontal position, and providing gradual variations in elevations, loading and unloading stations for matter to be supplied to the conveyor and removed therefrom, means for refrigerating matter carried by the conveyor, means for causing the circulation of air over the conveyor and in contact with the matter supported thereon for modifying the temperature thereof, and means whereby said conveyor including the wheel assemblies can be driven.

5. In a refrigeration system an endless conveyor of a character to receive and support thereon matter to be refrigerated, said endless conveyor having a series of spaced multiple tiers and gradual variations in elevations forming a spiral, said belt being of generally flat foraminous construction with at least one edge constructed and arranged to change its length and travel in a curved path along said multiple tiers while remaining substantially horizontal, anti-friction means supporting the several tiers of said conveyor, means for refrigerating matter carried by said conveyor, and means whereby said conveyor including its several tiers can be driven.

6. The structure of claim 4 in which the wheel assemblies include vertically spaced rings.

7. The structure of claim 4 in which said drive means is adjustable subject to the nature of the matter conveyed.

8. The structure of claim 4 in which one of said driven wheel assembly rotates faster than the movement of the conveyor.

9. The structure of claim 4 in which said conveyor is driven in spaced locations thereby avoiding concentration of the driving stress on the conveyor at one location.

10. The structure of claim 4 having means in which the conveyor is driven by the supporting wheel assemblies in a manner that one of the driven wheel assemblies rotates at a speed greater than the conveyor speed.

11. The structure of claim 4 including means for circulating air in contact with the material being conveyed in a manner to provide a uniform temperature throughout the area refrigerated.

12. Article processing apparatus for modifying the temperature of matter processed as set forth in claim 4 and including wall structure defining a chamber, the temperature of which is to be modified, and stratification means within said chamber separating portions from other portions whereby different temperatures may be obtained.

References Cited by the Examiner
UNITED STATES PATENTS

| | | | |
|---|---|---|---|
| 1,585,282 | 5/1926 | Dewey et al. | 198—136 X |
| 2,093,270 | 9/1937 | Glinka | 198—136 X |
| 2,386,558 | 10/1945 | Kleintop | 198—181 X |
| 2,550,615 | 4/1951 | Stansbury | 62—380 X |
| 2,758,391 | 8/1956 | Lanham | 198—136 X |
| 2,887,855 | 5/1959 | Glass | 198—136 X |

ROBERT A. O'LEARY, *Primary Examiner.*

W. E. WAYNER, *Assistant Examiner.*